(12) United States Patent
Dehandschutter

(10) Patent No.: US 6,959,167 B1
(45) Date of Patent: Oct. 25, 2005

(54) NOISE-LEVEL ADAPTIVE RESIDUAL ECHO SUPPRESSOR

(75) Inventor: Wouter Dehandschutter, Wilsele-Putkapel (BE)

(73) Assignee: ScanSoft, Inc., Peabody, MA (US)

( * ) Notice: Subject to any disclaimer, the term of this patent is extended or adjusted under 35 U.S.C. 154(b) by 563 days.

(21) Appl. No.: 09/927,780

(22) Filed: Aug. 10, 2001

Related U.S. Application Data

(60) Provisional application No. 60/224,597, filed on Aug. 11, 2000.

(51) Int. Cl.[7] ............................................. H04K 3/00
(52) U.S. Cl. ...................... 455/1; 455/63.1; 455/67.11; 455/423; 381/71.1; 708/304; 375/229
(58) Field of Search .......................... 455/10, 63.1–65, 455/67.11–67.7, 423, 501–506, 570; 370/286–292; 379/3, 406.01–406.16; 375/229–236; 708/300–304; 381/71.1

(56) References Cited

U.S. PATENT DOCUMENTS

| | | | |
|---|---|---|---|
| 4,852,161 A * | 7/1989 | Hagiwara | 379/406.05 |
| 5,016,271 A * | 5/1991 | Ford | 379/406.15 |
| 5,539,731 A * | 7/1996 | Haneda et al. | 370/286 |
| 5,636,323 A * | 6/1997 | Umemoto et al. | 704/226 |
| 5,644,596 A * | 7/1997 | Sih | 375/232 |
| 5,644,635 A * | 7/1997 | Armbruster | 379/406.08 |
| 5,668,794 A * | 9/1997 | McCaslin et al. | 370/288 |
| 5,848,151 A * | 12/1998 | Boudy et al. | 379/406.13 |
| 6,009,083 A * | 12/1999 | Flanagan et al. | 370/287 |
| 6,047,025 A * | 4/2000 | Johnson et al. | 375/232 |
| 6,173,056 B1 * | 1/2001 | Romesburg et al. | 379/406.01 |
| 6,178,162 B1 * | 1/2001 | Dal Farra et al. | 370/286 |
| 6,181,753 B1 * | 1/2001 | Takada et al. | 375/346 |
| 6,212,273 B1 * | 4/2001 | Hemkumar et al. | 379/406.08 |
| 6,633,894 B1 * | 10/2003 | Cole | 708/300 |
| 6,694,020 B1 * | 2/2004 | Benesty | 379/406.12 |

* cited by examiner

*Primary Examiner*—Stephen D'Agosta
(74) *Attorney, Agent, or Firm*—Bromberg & Sunstein LLP

(57) ABSTRACT

An improved echo control system has an adaptive controlled echo canceling filter arrangement in which a background filter updates the filter coefficients of an echo shaping filter responsive to a normalized least mean square (NLMS) algorithm. An adaptive control module determines a weighted reference signal for the background filter in which the weight is proportional to a far signal reference and an estimate of the norm of an echo canceller error vector, and inversely proportional to en estimate of a residue of the echo canceller. And a non-linear normalized convergence term is used in the NLMS algorithm.

16 Claims, 5 Drawing Sheets

Figure 1. Combination of echo canceller (adaptive filter EC) and post-processor.

PRIOR ART

Figure 2. Block diagram of echo canceller EC combined with echo shaping filter H.
PRIOR ART Figure 3. Attenuation characteristic of the echo shaping filter for algorithm MG1.

PRIOR ART

Figure 4. Attenuation characteristic of the echo shaping filter for algorithm MG2.

PRIOR ART

NOISE-LEVEL ADAPTIVE RESIDUAL ECHO SUPPRESSOR

This application claims priority from U.S. Provisional Patent Application 60/224,597, filed Aug. 11, 2000, the contents of which are incorporated herein by reference.

FIELD OF THE INVENTION

The invention relates to digital signal processing, and more particularly, to an adaptive filter that suppresses residual echo in the sent path of an echo canceller.

BACKGROUND ART

In a hands-free telephone, the far end acoustic signal can cause undesired feedback. This feedback can be neutralized by an appropriate echo suppression device. One such device, known as an acoustic echo canceller allows full duplex communication, but it requires significant computational resources and may not always provide enough echo attenuation. For example, under optimal conditions an acoustic echo canceller may provide a maximum echo reduction of 25 to 30 dB, whereas an optimal hands-free telephone conversation needs the echo level to be reduced by 40 to 45 dB. Therefore, acoustical echo cancellers in telecommunication devices are typically complemented with a so-called post-processor.

FIG. 1 shows a generic echo canceller arrangement with such a post-processor. The input signal d(k) is a combination of acoustical echo y(k), local speech s(k), and background noise n(k):

$$d(k)=y(k)+s(k)+n(k) \quad (1)$$

The echo cancelled residue e(k), in FIG. 1, is composed of a residual echo $\epsilon(k)$, the local speech signal s(k), and the background noise n(k), where $\epsilon(k)=y(k)-\hat{y}(k)$. The post-processor further suppresses the residual echo level after the echo canceller. This is commonly realized by a non-linear action, such as loss insertion, center clipping, etc. That typically means attenuating the signal at the output of the echo canceller. But, together with the residual echo level, the other signal components at the output of post-processor are also attenuated.

To avoid attenuating the local speech signal in the send path of the echo canceller, the operation of the post-processor may be controlled by a "voice activity detector" (VAD) that attempts to determine whether the local speaker is active or not. In the former case, the post-processor is not used and the echo residue is assumed to be masked by the local speech. In the latter case, the post-processor suppresses the residual echo to an acceptable low level. But, VAD-controlled post-processors are difficult to control, and give rise to artefacts such as chopping and clipping of local speech. Also, the noise component n(k) is not taken into account in the on/off decision of the post-processor, so the performance of such post-processors in noisy circumstances is rather poor—during local speech, the background noise passes through without attenuation; when the local speaker is not active, the background noise is suddenly shut off because it is suppressed along with the residual echo.

An echo shaping technique was suggested by R. Martin and S. Gustafsson in *An Improved Echo Shaping Algorithm for Acoustic Echo Control*, Proceedings of European Signal Processing Conference-96, pp. 25–28, September 11–13, Trieste, Italy, 1996, (hereinafter, "Martin and Gustafsson"), the contents of which are incorporated herein by reference. Martin and Gustafsson suggest using an adaptive echo shaping filter placed in the echo canceller send path for a post-processor. This creates a "soft decision directed" residual echo suppressor that does not exhibit the "on/off" behavior found in classical residual echo suppressors. As a result, quality of speech (i.e. the observed distortions of local speech) has been found to be better than what can be achieved with classical post-processors. As an additional advantage, the proposed echo shaping filter may largely compensate for poor performance of the echo canceller. Therefore it has been suggested to design an echo controller having of a relatively low order echo canceller (typically, 20 coefficients) followed by the echo shaping filter.

FIG. 2 presents a block diagram of an echo canceller EC combined with an echo shaping filter H. The echo shaping technique employs two low order finite impulse response (FIR) filters: background filter $H_1$ is an adaptive filter that is updated in the background, its contents are copied into the postfilter H, which filters the echo canceller EC residue e(k). The updates to back ground filter $H_1$ have to be controlled so that frequencies of e(k) are attenuated only where the echo residue $\epsilon(k)$ has more power than the local speech s(k). Thus, echo shaping filter H has to attenuate the echo residue $\epsilon(k)$ at those frequencies where it is particularly audible, while at the same time the distortion of the local speech s(k) must be kept at an acceptable level. Therefore the key issue of the echo shaping technique is how the background filter $H_1$ is updated.

Background filter $H_1$ is a low-order (typically 20 coefficients) FIR filter that is updated by adaptation following a normalized least-mean square (NLMS) algorithm. The reference signal z(k) of the background filter $H_1$ is synthesized as a combination of the microphone signal d(k) and the echo canceller EC residue e(k) as follows:

$$z(k)=\alpha(k)d(k)+(1-\alpha(k))e(k), \quad (2)$$

where $\alpha(k)$ is a time varying non-negative control factor that is determined by an "adaptive control" mechanism.

Since $e(k)=d(k)-\hat{y}(k)$, (2) can also be written as $$z(k)=e(k)+\alpha(k)\hat{y}(k) \quad (3)$$

Thus by changing the control factor $\alpha(k)$, the contribution of an estimate of the echo in the synthesized signal z(k) can be controlled. (In contrast to the echo canceller EC, since for the adaptation of the echo shaping filter H it is not important to dispose of an exact echo estimate in terms of amplitude and phase. Because of the adaptive control mechanism in the control factor $\alpha(k)$ it is sufficient to have a rough idea of the energy in the echo.) When $\alpha(k)=0$, $z(k)=e(k)$ and the NLMS algorithm will adapt background filter $H_1$ such that it changes into an all-pass filter. Thus, echo shaping filter H will have no influence on the echo canceller EC residue. This is the preferred case where only the local speaker is active, or where both speakers are active but the echo canceller EC has already achieved a significant reduction of the echo. By increasing the control factor $\alpha(k)$, the relative contribution of the echo to z(k) is increased. This also implies that the relative contribution of the echo is increased in the background filter error signal $e_h(k)$. Since the NLMS algorithm will adapt the background filter $H_1$ so that it attempts to strongly attenuate this error contribution, echo shaping filter H also will strongly attenuate the residual echo in e(k).

Clearly, a key aspect is the control algorithm for the control factor $\alpha(k)$. During single far talk, $\alpha(k)$ should be as high as possible, whereas when only the local speaker is active, it should be close to zero. During double talk, an appropriate value for α(k) must be used so that attenuation of the local speech is avoided while at the same time the echo residue is attenuated at frequencies where it is not masked by local speech.

Martin and Gustafsson proposed two control algorithms for the control factor α(k). The first one, which will be referred to as MG1, was designed to explicitly account for the degree of echo attenuation already achieved by the echo canceller EC in order to avoid unnecessary local speech level modulations. It turned out, however, that this MG1 control algorithm is very sensitive to estimation errors. That is because good estimates of the echo attenuation achieved by the echo canceller EC are not easily obtained—especially during double talk. Therefore, the MG1 algorithm is not practically relevant.

The second control algorithm, which will be referred to as MG2, calculates the control factor α(k) as the ratio of the momentarily power of the estimated echo and the momentarily power of the echo canceller EC residue. While this algorithm is very simple to implement, it has an important drawback; that is that α(k) tends to fluctuate very strongly and in a large range (>1e5). Theoretically, the control factor α(k) is only limited to being non-negative, so at first sight this does not seem to be very constraining. However, in practice it has been observed that an upper limit should be placed on α(k) for reasons of stability. Furthermore, due to the large fluctuations in the contributions to z(k), hence $e_h(k)$, the NLMS algorithm has to "work very hard" to update background filter $H_1$ to the continually changing conditions. Although the background filter $H_1$ is rather short, it has been observed that the NLMS algorithm must be run with a rather large convergence coefficient in order to achieve the necessary convergence speed. This also gives rise to a lot of instabilities. Finally, the proposed MG2 control algorithm tends to be fairly aggressive, and often attenuates low-level local speech (e.g. it chops soft speech onsets, etc.). Another consequence of being so aggressive is that the MG2 algorithm doesn't work well in the presence of significant background noise where it gives rise to annoying modulations similar in character to the switching modulations of a classical suppressor.

Thus, the problem with the MG2 algorithm is that it can be far too aggressive. This can be illustrated by plotting the attenuation characteristic of the echo shaping filter using different control algorithms, and for different levels of echo cancellation (the so-called ERLE—echo return loss enhancement) achieved by the echo canceller EC.

FIG. 3 presents the attenuation characteristic of the echo shaping filter H for control algorithm MG1. The attenuation characteristic has been plotted as a function of the parameter ρ(ω), where ρ(ω) denotes the ratio of the local speech plus background noise to the echo:

$$\rho(\omega) = \frac{R_{ss}(\omega) + R_{nn}(\omega)}{R_{yy}(\omega)}, \quad (4)$$

where $R_{ss}(\omega)$ is the auto-power spectral density of the local speech signal, etc. As shown in FIG. 3, the MG1 algorithm realizes a near-to-optimal behavior, that as soon as the local speech (plus background noise) level is lower than the echo level (i.e. ρ(ω)<1), the attenuation achieved by the echo shaping filter H increases. This compensates for the fact that in such a case the local speech would not efficiently mask the residual echo. Also, the lower the ERLE, the more attenuation is achieved by the echo shaping filter H, thus compensating for the shortcomings of the echo canceller EC. Unfortunately, as discussed above, it is not possible to achieve the predicted behavior for the MG1 algorithm in practice.

The attenuation characteristic of the echo shaping filter H when its updates are controlled by the MG2 algorithm is shown FIG. 4. This shows that MG2 is a rather brute force solution that gives rise to very high attenuation in many conditions. Also, the attenuation curves start to rise when ρ(ω)>1, showing why low level local speech is sometimes chopped as well. Moreover, the attenuation achieved by the echo shaping filter H increases together with increasing ERLE which is rather undesirable. NOTE: The attenuation characteristic presented in Figure does not resemble the one presented by Martin and Gustafsson, which, however, has been found to be incorrect. Therefore some of the conclusions drawn by Martin and Gustafsson with respect to the MG2 algorithm are not correct either.

Thus, two deficiencies of the Martin and Gustafsson echo shaping approach have been observed: (1) the proposed algorithm was not always stable, and (2) the proposed algorithm still gives rise to annoying noise modulations. In order to cope with (2), Martin and Gardner proposed using a comfort noise generator (CNG). The CNG is run at the output of the post-processor, and adds noise to the post-processor output during local speech pauses so that the observed background noise level (and ideally, the noise spectrum) is the same during both local speech and local speech pauses. This approach has the drawbacks that the complexity of the combined echo shaping filter and CNG increases (especially if the background noise is synthesized accurately), and the operation of the CNG is again VAD-driven so that artefacts (due to mistakes made by the VAD) must—again—be anticipated.

SUMMARY OF THE INVENTION

A representative embodiment of the present invention includes an improved echo control system and method having an echo-containing near signal input. An echo canceller is coupled to a far signal reference and produces an echo estimate signal output representative of the echo contained in the near signal. A signal coupling node is coupled to the near signal input and the echo estimate signal output, and produces an echo-canceled signal output having an echo residue. An echo shaping filter is coupled to the echo-canceled signal output, and reduces the echo residue and provides an echo-suppressed signal output. The echo shaping filter has a spectral response determined by filter coefficients. A background filter is coupled to: (a) an error signal representative of the difference between: (i) the echo canceled signal, and (ii) a signal representative of background filter spectral response, and (b) an adaptive control module producing a reference signal output that is a weighted sum of: (i) the echo-containing signal, and (ii) the echo canceled signal. The background filter updates the filter coefficients of the echo shaping filter responsive to a normalized least mean square (NLMS) algorithm. The improvement includes determining, in the adaptive control module, a reference signal weight for the weighted sum, the weight being proportional to the far signal reference; and an estimate of the norm of an echo canceller error vector, and inversely proportional to an estimate of a residue of the echo canceller; and using a non-linear normalized convergence term in the NLMS algorithm.

In a further embodiment, the echo canceller, the echo shaping filter, the background filter, or combination may be a finite impulse response (FIR) filter.

The echo canceller error vector may be determined as:

$$\Delta w(k) = w_{ep} - w(k)$$

where $\Delta w(k)$ represents the echo canceller error vector, $w_{ep}$ represents a physical echo path identified by the echo canceller, and $w(k)$ the echo canceller response.

The reference signal weight may be determined as:

$$\alpha(k) = \frac{\beta \|\Delta w(k)\| \bar{x}_s(k)}{\bar{e}_s(k)}$$

where $\alpha(k)$ represents the reference signal weight, $\beta$ represents a constant normalizing term, $\|\Delta w(k)\|$ represents an estimate of the norm of the echo canceller error vector, $\bar{x}_s(k)$ represents a short-term average magnitude of the far signal reference, and $\bar{e}_s(k)$ represents a short-term average magnitude of the echo canceller residue.

The echo canceller error vector may be determined as:

$$\frac{N + N_T}{N_T} \sum_{i=1}^{N_T} |w_i(k)|.$$

The NLMS update algorithm may be:

$$h(k+1) = h(k) + \frac{\mu}{\zeta + z(k)^T z(k)} z(k) e_h(k)$$

where $h(k)$ represents the echo shaping filter having an order $L_H$, $z(k)$ represents a vector representing the $L_H$ most recent values of the reference signal output, $e_h(k)$ represents the error signal, $\zeta$ represents a non-negative constant, and $$\frac{\mu}{\zeta + z(k)^T z(k)}$$

represents a normalized convergence coefficient.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
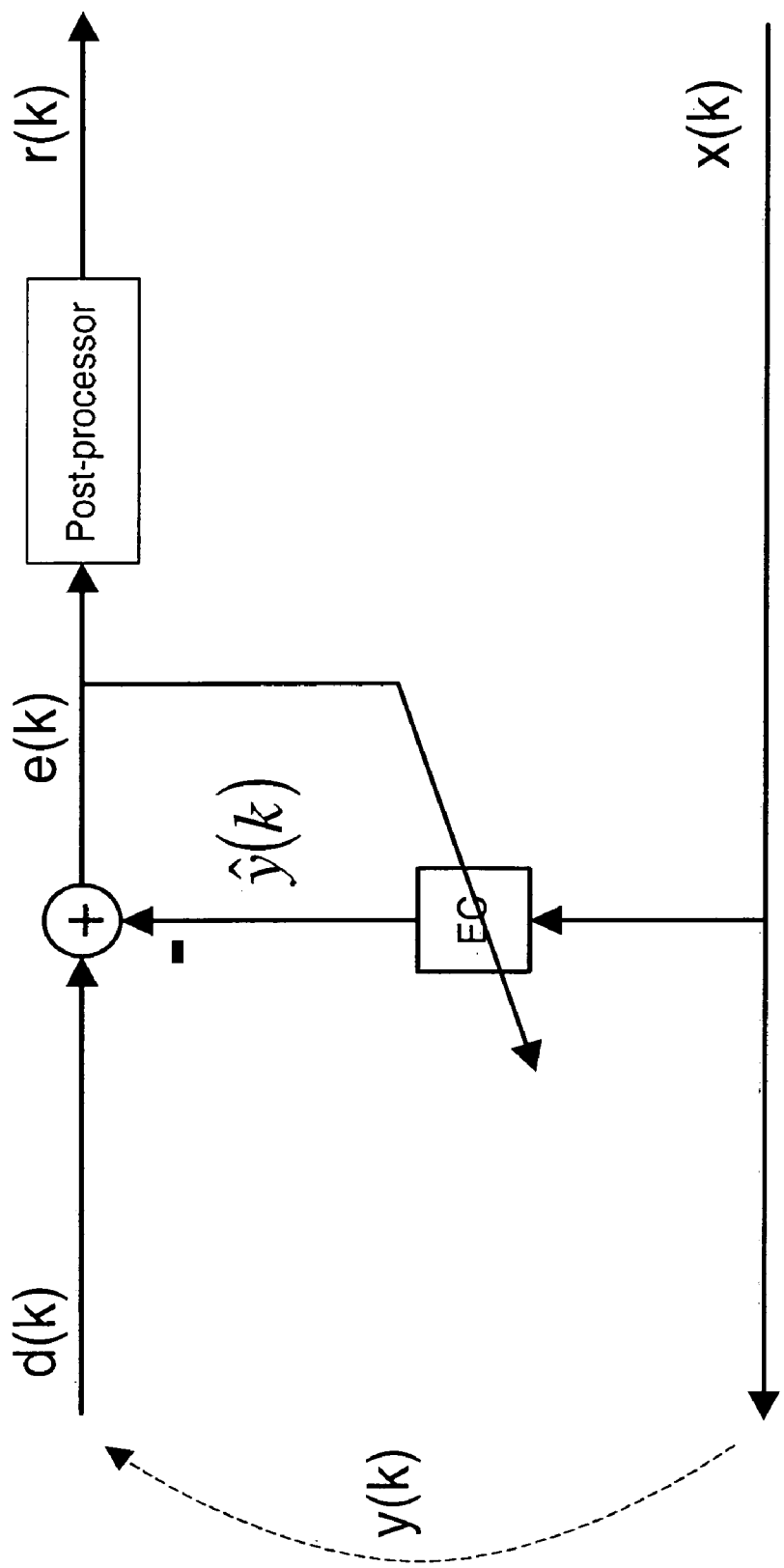
FIG. 1 shows a generic acoustic echo canceller with a post-processor.
Figure 2:
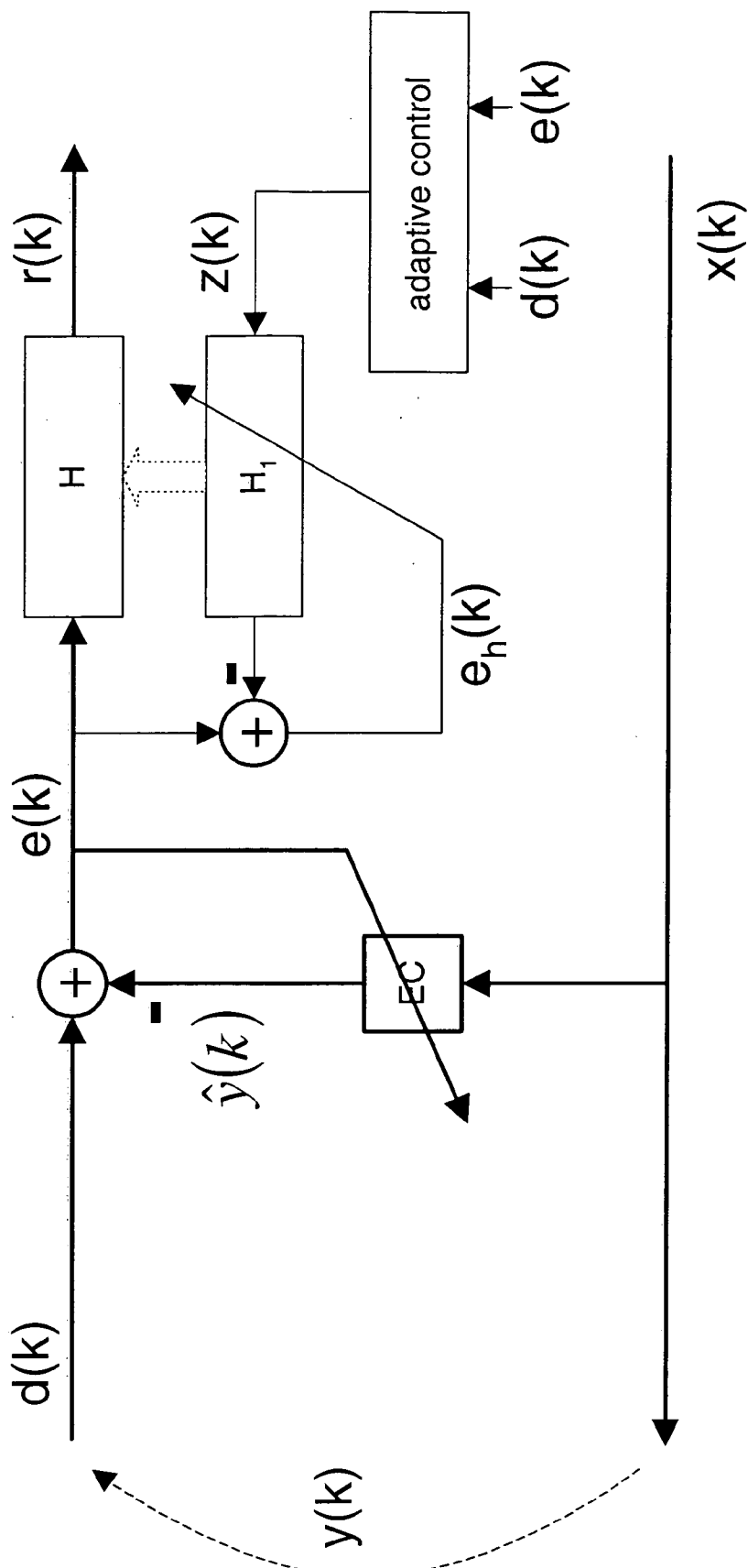
FIG. 2 shows an echo cancelling system with an adaptive filter echo canceller EC and an echo shaping filter H.
Figure 3:
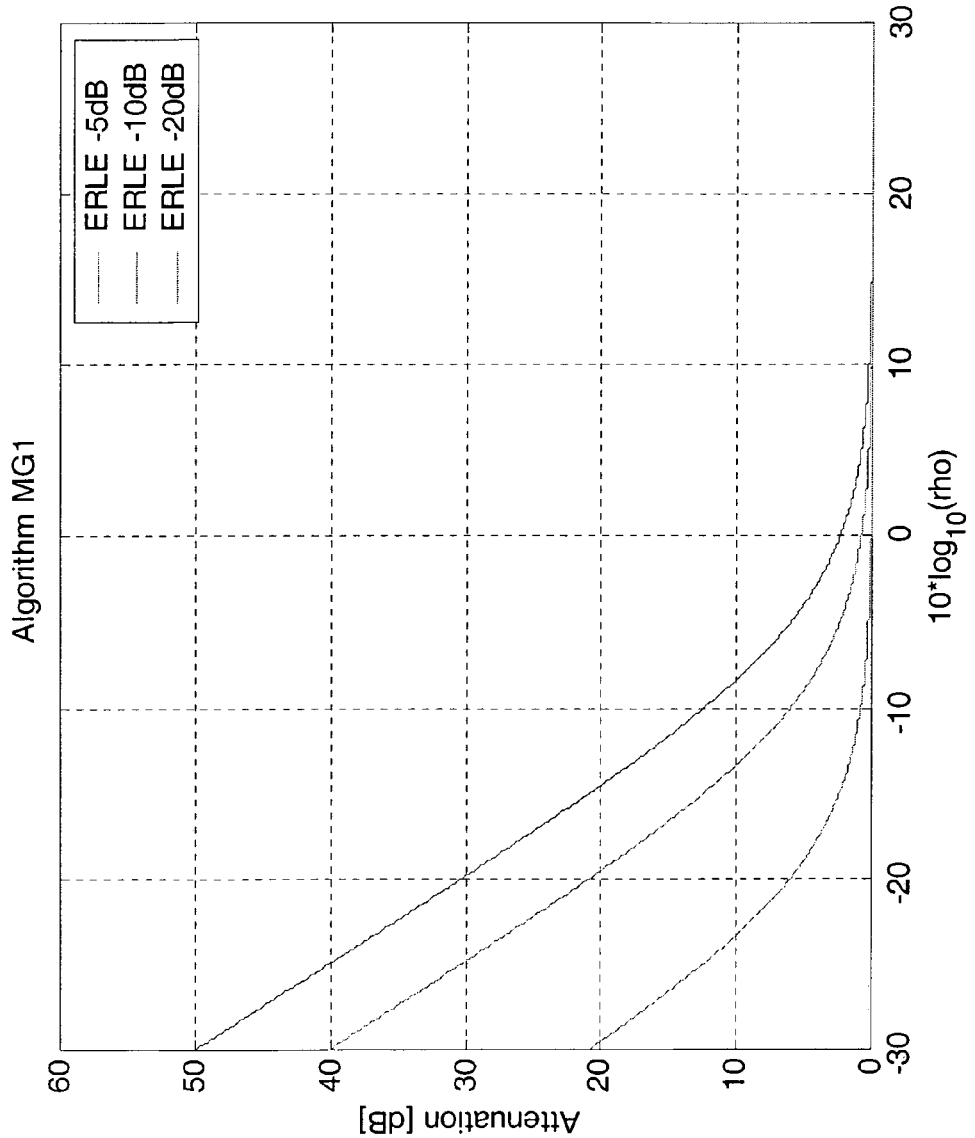
FIG. 3 shows the attenuation characteristic of the echo shaping filter H for the MG1 algorithm.
Figure 4:
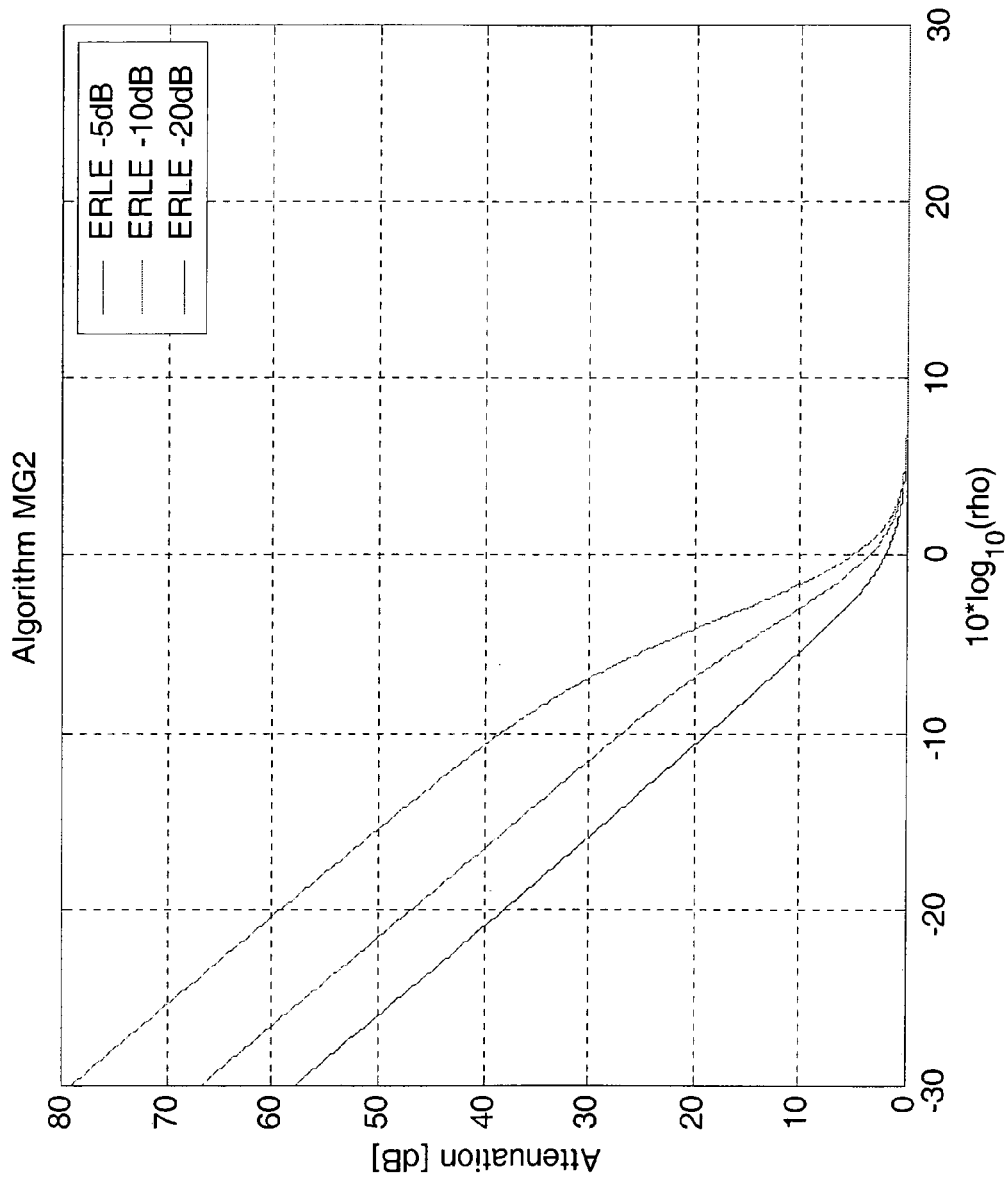
FIG. 4 shows the attenuation characteristic of the echo shaping filter H for the MG2 algorithm.

Representative embodiments of the present invention include an improved echo control system of the type shown in FIG. 2, in which the time varying control factor $\alpha(k)$ in the adaptive NLMS algorithm of the background filter $H_1$ is controlled so that both the ERLE achieved by the echo canceller EC and the low level local speech and noise contributions are explicitly taken into account. Unlike the MG2 algorithm proposed in Martin and Gustafsson, the adaptation of the residual echo suppressing filter is governed both by a noise-level adaptive steering mechanism and by a data non-linearity.

One advantage of adaptation to the noise level is that it allows the residual echo suppressing filter to be used in conditions with a high noise level. Suppression of residual echo under these conditions would normally give rise to annoying noise modulation artefacts, hence necessitating the operation of a Comfort Noise Generator (CNG) at the output of the residual echo suppressing filter. The post-processor of representative embodiments obviates the need for a CNG by controlling the updates to the adaptive echo shaping filter so that it tends towards an all-pass filter in noisy conditions. This avoids noise modulations and makes efficient use of the fact that the high background noise masks the residual echo at the output of the echo canceller. The data non-linearity optimally balances the stability of the adaptation on the one hand, and the achieved residual echo suppression when using the noise-level adaptive steering mechanism on the other hand.

Figure 5:
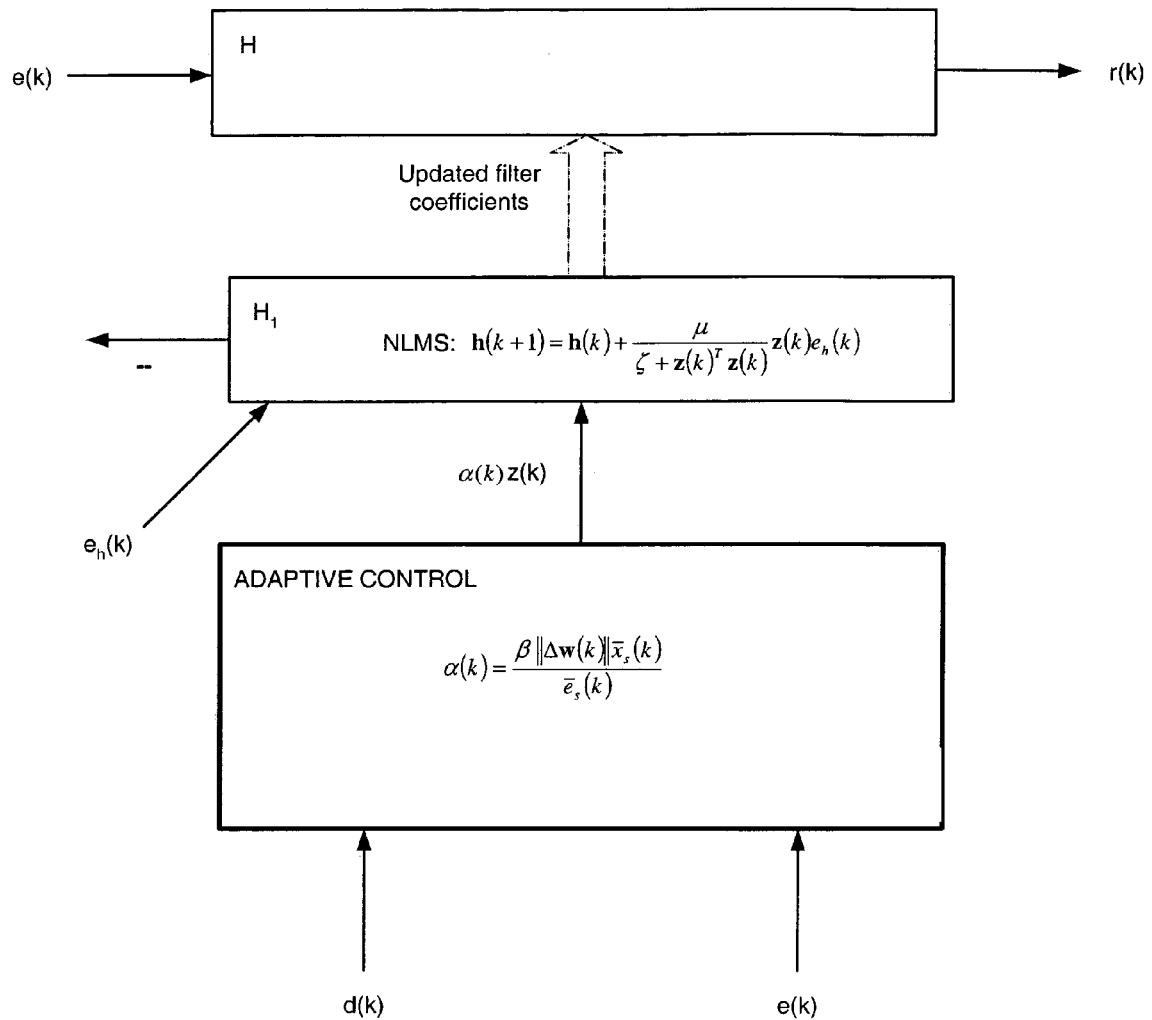
FIG. 5 shows details of an adaptive controlled filter arrangement of an echo canceling system according to one embodiment of the present invention.

FIG. 5 shows details of an adaptive controlled filter arrangement of an echo canceling system according to one embodiment of the present invention. The adaptive control block shown in FIG. 5 calculates the control factor $\alpha(k)$ as:

$$\alpha(k) = \frac{\beta \|\Delta w(k)\| \bar{x}_s(k)}{\bar{e}_s(k)} \qquad (5)$$

where $\bar{x}_s(k)$ is the short-term average magnitude of the reference signal of the echo canceller EC, $\bar{e}_s(k)$ is the short-term average magnitude of the echo canceller EC residue, $\|\Delta w(k)\|$ is an estimate of the norm of the error vector of the echo canceller adaptive filter, and $\beta$ is a constant term which can be used to normalize the equation somewhat. The error vector of the echo canceller adaptive filter may then be defined as:

$$\Delta w(k) = w_{ep} - w(k)$$

where $w_{ep}$ is the impulse response of the physical echo path that must be identified by the echo canceller EC, and $w(k)$ is the echo canceller adaptive filter.

A relatively good estimator for the norm of the error vector of the echo canceller adaptive filter can be constructed by delaying the received signal a known number of samples $N_T$ back in time, and extending the echo canceller adaptive filter by the same number of coefficients. This will cause the adaptive filter to have at least $N_T$ coefficients, which ideally should be zero. A good estimate for the filter error is then given by:

$$\frac{N+N_T}{N_T}\sum_{i=1}^{N_T}|w_i(k)|.$$

Using the above algorithm to control the control factor $\alpha(k)$ has several advantages:
1. The control factor $\alpha(k)$ will be large as long as the echo canceller EC has not converged to the optimal solution.
2. If there is no background noise and the local speaker is not active, the echo canceller EC residue is purely residual echo, thus the control factor $\alpha(k)$ will be large and the residual echo is strongly attenuated.
3. On the other hand, the control factor $\alpha(k)$ will be reduced as soon as the level of the echo canceller EC residue exceeds the level of the echo canceller EC reference signal (the far end signal) weighted by the filter error norm. As soon as the latter weighting factor is relatively small (i.e. the echo canceller EC has converged), low-level contributions to the echo canceller EC residue also will decrease the control factor $\alpha(k)$, and therefore these contributions will not be attenuated by the echo shaping filter.
4. The used estimators are based on signal amplitudes rather than signal power, thus limiting the dynamic range of the internal variables and facilitating implementation on fixed-point processors.

The implementation of this control algorithm for the control factor $\alpha(k)$ requires a lot of information from the echo canceller EC. With this approach the echo canceller EC and the echo shaping filter H become a tightly connected combined system for echo suppression.

In practice, representative embodiments greatly reduce artefacts such as local speech attenuation and background noise modulations, and at the same time, attenuation of the residual echo during single far talk is reduced as well. That is because the value of the control factor $\alpha(k)$ still fluctuates quite strongly in time. This explains a basic difference between representative embodiments and the MG2 algorithm. In both cases, the NLMS algorithm is not able to continuously track the fluctuating error signal $e_h(k)$ and thus a kind of "average" echo shaping filter is obtained. In the case of the MG2 algorithm, this "averaging" process in the updates of the echo shaping filter H is dominated by large values of the control factor $\alpha(k)$. Therefore, the echo shaping filter H attenuates the echo canceller EC residue very strongly (including background noise and low-level local speech). In the case of the new control algorithm, however, the average value of $\alpha(k)$ is much smaller (around 1). Consequently, the averaging process in the updates of the echo shaping filter H tends to yield a filter that does not sufficiently attenuate the echo canceller EC residue.

At first sight, a simple solution would be to increase the convergence speed of the NLMS algorithm. With this, however, the stability margin of the algorithm strongly reduced, which is highly undesirable. Careful study of the behavior of the echo shaping filter H when its updates are controlled by (5), however, have shown that a modified update rule of the NLMS algorithm can solve this problem.

As explained before, the control algorithm for $\alpha(k)$ should bring $\alpha(k)$ close to zero when the local speaker is active. When $\alpha(k) \approx 0$, the echo shaping filter H will evolve to an all-pass filter, and the local speech will pass through almost unattenuated. With the new control algorithm (5), however, there are other occasions where $\alpha(k)$ tends to zero. Specifically, $\alpha(k)$ decreases whenever the level of the far end speech, estimated by $\bar{x}_s(k)$, decreases. As this happens at the end of each word, this suggests that the echo shaping filter H is driven towards all-pass behavior at the end of each word uttered by the far end speaker, and that it has to re-converge to an attenuation filter during the next word. Because of the limitations on the convergence speed, the echo shaping filter H is never able to achieve a high attenuation. (When the far end signal is music, the signal level is relatively constant, and the value of $\alpha(k)$ does not fluctuate so strongly. Thus, the conditions for updating the echo shaping filter H are also more stable and the achieved residual echo attenuation is larger.)

Hence, the solution to this problem is to avoid updates to the echo shaping filter H when the decrease of the control factor $\alpha(k)$ is not due to the activity of the local speaker. This can be achieved by modifying the NLMS update rule of the echo shaping filter.

The standard NLMS update rule is:

$$h(k+1) = h(k) + \frac{\mu}{z(k)^T z(k)} z(k) e_h(k) \quad (6)$$

where $h(k)$ is the adaptive echo shaping filter of order $L_H$, $z(k)$ is a vector constituted of the $L_H$ most recent $z(k)$ values, calculated by (3), and $e_h(k)$ is the error signal, as shown in FIG. 2.

To improve attenuation performance of the echo shaping filter, the following modified NLMS update rule is used:

$$h(k+1) = h(k) + \frac{\mu}{\zeta + z(k)^T z(k)} z(k) e_h(k) \quad (7)$$

where $\zeta$ is a non-negative constant. The main effect of adding this constant term in the NLMS update rule is that the normalized convergence coefficient $$\frac{\mu}{\zeta + z(k)^T z(k)}$$

no longer increases inversely proportional to the energy in the $z(k)$-vector. On the contrary, whenever the energy in the $z(k)$-vector becomes very low, the NLMS updates are slowed down when compared to the case without the constant term $\zeta$.

To understand why this helps the echo shaping filter H to achieve higher attenuation, it should be considered under what conditions the energy in the $z(k)$-vector can become low. Recall that the signal $z(k)$ is synthesized by adding $e(k)$ and $\alpha(k)\hat{y}(k)$. Thus, if the local speaker is active, then the control factor $\alpha(k)$ will be low because of (5) but at the same time $e(k)$ will have a high level. In this case, the energy in the $z(k)$-vector is high, the effect of the constant term $\zeta$ is negligible, the echo shaping filter H converges rapidly to an all-pass filter, and local speech is not attenuated. If the local speaker is not active, then the first term in $z(k)$ is small. If, at the same time, the far end speaker is active, then the control factor $\alpha(k)$ will be high. Thus again, the energy in the $z(k)$-vector will be high and the echo shaping filter H starts to converge to the appropriate attenuation filter. If, however, the far end speaker stops speaking, the energy in the z(k)-vector will decrease. Where the standard NLMS update rule would compensate for this, the modified NLMS update rule shown in (7) will inhibit further updates to the echo shaping filter. Whenever the energy in the z(k)-vector increases again, the echo shaping filter will again be updated. If the increase in energy in the z(k)-vector is due to single far end speech, the echo shaping filter will further converge to the appropriate attenuation filter.

For this strategy to work, an appropriate value needs to be selected for the constant term $\zeta$. For too low a value, its effect is negligible, whereas too high a value will continuously slow down the NLMS-adaptation. However, "too high" and "too low" must be related to the actual levels of the input signals of the echo canceller EC (and the post-processor). As these levels may be different per specific case, an optimal setting for $\zeta$ in one setting may not be optimal for another specific case. In practice, however, it has been observed that for a chosen value of the constant term $\zeta$, all input signal levels may vary in a large range without affecting the functionality of the control algorithm of the echo shaping filter.

With this modified NLMS update rule, two objectives can be realized: less modulations of background noise and low-level local speech, and high attenuation of single far end speech.

Although various exemplary embodiments of the invention have been disclosed, it should be apparent to those skilled in the art that various changes and modifications can be made which will achieve some of the advantages of the invention without departing from the true scope of the invention. For example, alternative embodiments may be used to control the level of echo present in the input signal of an Interactive Voice Response application, thus improving the speech recognition performance of this application.

What is claimed is:

1. An improved echo control system including:
an echo-containing near signal input;
an echo canceller, coupled to a far signal reference, producing an echo estimate signal output representative of the echo contained in the near signal;
a signal coupling node, coupled to the near signal input and the echo estimate signal output, producing an echo-canceled signal output having an echo residue;
an echo shaping filter, coupled to the echo-canceled signal output, reducing the echo residue and providing an echo-suppressed signal output, the echo shaping filter having a spectral response determined by filter coefficients; and
a background filter, coupled to:
(a) an error signal representative of the difference between:
 (i) the echo canceled signal, and
 (ii) a signal representative of background filter spectral response, and
(b) an adaptive control module producing a reference signal output that is a weighted sum of:
 (i) the echo-containing signal, and
 (ii) the echo canceled signal,
the background filter updating the filter coefficients of the echo shaping filter responsive to a normalized least mean square (NLMS) algorithm;
wherein the improvement comprises:
determining, in the adaptive control module, a reference signal weight for the weighted sum, the weight being proportional to the far signal reference; and an estimate of the norm of an echo canceller error vector, and inversely proportional to en estimate of a residue of the echo canceller; and
using a non-linear normalized convergence term in the NLMS algorithm.

2. An improved echo control system according to claim 1, wherein the echo canceller is a finite impulse response (FIR) filter.

3. An improved echo control system according to claim 1, wherein the echo shaping filter is a finite impulse response (FIR) filter.

4. An improved echo control system according to claim 1, wherein the background filter is a finite impulse response (FIR) filter.

5. An improved echo control system according to claim 1, wherein the echo canceller error vector is determined as:

$$\Delta w(k) = w_{ep} - w(k)$$

where $\Delta w(k)$ represents the echo canceller error vector, $w_{ep}$ represents a physical echo path identified by the echo canceller, and $w(k)$ the echo canceller response.

6. An improved echo control system according to claim 1, wherein the reference signal weight is determined as:

$$\alpha(k) = \frac{\beta \|\Delta w(k)\| \bar{x}_s(k)}{\bar{e}_s(k)}$$

where $\alpha(k)$ represents the reference signal weight, $\beta$ represents a constant normalizing term, $\|\Delta w(k)\|$ represents an estimate of the norm of the echo canceller error vector, $\bar{x}_s(k)$ represents a short-term average magnitude of the far signal reference, and $\bar{e}_s(k)$ represents a short-term average magnitude of the echo canceller residue.

7. An improved echo control system according to claim 6, wherein the echo canceller error vector is determined as:

$$\frac{N + N_T}{N_T} \sum_{i=1}^{N_T} |w_i(k)|.$$

8. An improved echo control system according to claim 1, wherein the NLMS update algorithm is:

$$h(k+1) = h(k) + \frac{\mu}{\zeta + z(k)^T z(k)} z(k) e_h(k)$$

where $h(k)$ represents the echo shaping filter having an order $L_H$, $z(k)$ represents a vector representing the $L_H$ most recent values of the reference signal output, $e_h(k)$ represents the error signal, $\zeta$ represents a non-negative constant, and $$\frac{\mu}{\zeta + z(k)^T z(k)}$$

represents a normalized convergence coefficient.

9. An improved method of echo control including:
providing an echo-containing near signal input;
producing, with an echo canceller coupled to a far signal reference, an echo estimate signal output representative of the echo contained in the near signal;

producing, with a signal coupling node coupled to the near signal input and the echo estimate signal output, an echo-canceled signal output having an echo residue;

reducing, with an echo shaping filter coupled to the echo-canceled signal output, the echo residue and providing an echo-suppressed signal output, the echo shaping filter having a spectral response determined by filter coefficients; and providing a background filter, coupled to:
(a) an error signal representative of the difference between:
  (i) the echo canceled signal, and
  (ii) a signal representative of back ground filter spectral response, and
(b) an adaptive control module producing a reference signal output that is a weighted sum of:
  (i) the echo-containing signal, and
  (ii) the echo canceled signal,
  the background filter updating the filter coefficients of the echo shaping filter responsive to a normalized least mean square (NLMS) algorithm;
wherein the improvement comprises:

determining, in the adaptive control module, a reference signal weight for the weighted sum, the weight being proportional to the far signal reference; and an estimate of the norm of an echo canceller error vector, and inversely proportional to en estimate of a residue of the echo canceller; and using a non-linear normalized convergence term in the NLMS algorithm.

10. An improved echo control method according to claim 9, wherein the echo canceller is a finite impulse response (FIR) filter.

11. An improved echo control method according to claim 9, wherein the echo shaping filter is a finite impulse response (FIR) filter.

12. An improved echo control method according to claim 9, wherein the background filter is a finite impulse response (FIR) filter.

13. An improved echo control method according to claim 9, wherein the echo canceller error vector is determined as:

$$\Delta w(k) = w_{ep} - w(k)$$

where $\Delta w(k)$ represents the echo canceller error vector, $w_{ep}$ represents a physical echo path identified by the echo canceller, and $w(k)$ the echo canceller response.

14. An improved echo control method according to claim 9, wherein the reference signal weight is determined as:

$$\alpha(k) = \frac{\beta \|\Delta w(k)\| \bar{x}_s(k)}{\bar{e}_s(k)}$$

where $\alpha(k)$ represents the reference signal weight, $\beta$ represents a constant normalizing term, $\|\Delta w(k)\|$ represents an estimate of the norm of the echo canceller error vector, $\bar{x}_s(k)$ represents a short-term average magnitude of the far signal reference, and $\bar{e}_s(k)$ represents a short-term average magnitude of the echo canceller residue.

15. An improved echo control method according to claim 14, wherein the echo canceller error vector is determined as:

$$\frac{N + N_T}{N_T} \sum_{i=1}^{N_T} |w_i(k)|.$$

16. An improved echo control method according to claim 9, wherein the NLMS update algorithm is:

$$h(k+1) = h(k) + \frac{\mu}{\zeta + z(k)^T z(k)} z(k) e_h(k)$$

where $h(k)$ represents the echo shaping filter having an order $L_H$, $z(k)$ represents a vector representing the $L_H$ most recent values of the reference signal output, $e_h(k)$ represents the error signal, $\zeta$ represents a non-negative constant, and $$\frac{\mu}{\zeta + z(k)^T z(k)}$$

represents a normalized convergence coefficient.

* * * * *